United States Patent
Novak et al.

(10) Patent No.: US 10,509,574 B2
(45) Date of Patent: Dec. 17, 2019

(54) CONTAINER CREDENTIALING BY HOST

(71) Applicant: Microsoft Technology Licensing, LLC, Redmond, WA (US)

(72) Inventors: Mark Novak, Bellevue, WA (US); Benjamin Moore, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 15/162,863

(22) Filed: May 24, 2016

(65) Prior Publication Data

US 2017/0228182 A1 Aug. 10, 2017

Related U.S. Application Data

(60) Provisional application No. 62/292,848, filed on Feb. 8, 2016.

(51) Int. Cl.
*G06F 21/31* (2013.01)
*G06F 3/06* (2006.01)
(Continued)

(52) U.S. Cl.
CPC ............ *G06F 3/0622* (2013.01); *G06F 3/067* (2013.01); *G06F 3/0653* (2013.01);
(Continued)

(58) Field of Classification Search
USPC ............ 726/2, 7, 21, 36; 713/150, 163, 181; 380/255, 264, 276
See application file for complete search history.

(56) References Cited

U.S. PATENT DOCUMENTS 8,051,470 B2 * 11/2011 Ong .................. G06F 21/31
726/18
8,281,149 B2 * 10/2012 Laurie .................. G06F 21/31
709/217
(Continued)

OTHER PUBLICATIONS

International Search Report and the Written Opinion of the International Searching Authority, Issued for PCT Application No. PCT/US2017/015921, dated Mar. 22, 2017, 12 pages.
(Continued)

*Primary Examiner* — Sharif E Ullah
(74) *Attorney, Agent, or Firm* — International IP Law Group, PLLC

(57) ABSTRACT

Techniques for implementing container credentialing by a host are described herein. In one example, a system for providing credentials includes a memory device for storing instructions and a processing device for executing instructions. The system can also include a container to execute a runtime environment for an application through the memory device and processing device, the application to request access to a credential locked resource. The system can also include a host environment to share the memory and the processing device with the container. In an example, the host environment may detect a request for a credential for the credential locked resource from the container. In an example, the host environment may also provide a credential for a credential locked resource to the container if the container is approved to receive the credential based on a policy.

20 Claims, 6 Drawing Sheets

(51) Int. Cl.
*H04L 29/06* (2006.01)
*G06F 21/33* (2013.01)
*G06F 21/62* (2013.01)
*H04L 9/32* (2006.01)

(52) U.S. Cl.
CPC .......... *G06F 3/0685* (2013.01); *G06F 21/335* (2013.01); *G06F 21/6218* (2013.01); *H04L 9/3213* (2013.01); *H04L 29/06761* (2013.01); *H04L 63/08* (2013.01); *H04L 63/0807* (2013.01); *H04L 63/10* (2013.01); *H04L 63/108* (2013.01); *H04L 63/20* (2013.01)

(56) References Cited

U.S. PATENT DOCUMENTS

| | | | | |
|---|---|---|---|---|
| 8,898,472 | B2* | 11/2014 | Kandrasheu | H04L 9/006 713/175 |
| 2007/0250904 | A1* | 10/2007 | Waller | G06F 21/6245 726/1 |
| 2010/0306835 | A1* | 12/2010 | Coan | G06Q 50/265 726/7 |
| 2013/0185557 | A1* | 7/2013 | Renganathan | G06F 21/64 713/168 |
| 2013/0254401 | A1* | 9/2013 | Marshall | G06F 21/6218 709/226 |
| 2014/0032759 | A1* | 1/2014 | Barton | H04L 67/10 709/225 |
| 2014/0281491 | A1* | 9/2014 | Zaverucha | H04L 9/321 713/155 |
| 2015/0089620 | A1* | 3/2015 | Manza | H04L 63/0838 726/8 |
| 2015/0302398 | A1* | 10/2015 | Desai | G06F 8/60 705/41 |

OTHER PUBLICATIONS

"Mobile Device Security", In White Paper of Opentrust, Oct. 2014, pp. 1-16.
Schulze-Hewett, et al., "Centralized Credential Management Servlet (CCMS)", Published on: Nov. 19, 2012 Available at: http://www.infoseccorp.com/products/ccms/ccms10man.pdf.
Corella, et al., "An Example of a Derived Credentials Architecture", In Technical Report of Pomcor, Mar. 31, 2014, pp. 1-34.
Ganesan, Ravi, "How to Use Key Escrow", In Journal of Communications of the ACM, vol. 39, Issue 3, Mar. 1996, pp. 32-33.
Camenisch, et al., "Credential-Based Access Control Extensions to XACML", In Proceedings of W3C Workshop on Access Control Application Scenarios, vol. 17, Nov. 17, 2009, pp. 1-7.
Lapon, Jorn, "Anonymous Credential Systems: From Theory Towards Practice", In Dissertation of Catholic University of Leuven, Jul. 2012, 272 pages.
Camenisch, et al., "Credential Authenticated Identification and Key Exchange", In Proceedings of International Association for Cryptologic Research, May 25, 2010, pp. 1-41.
"Securing Web Applications", Published on: Feb. 12, 2012 Available at: https://docs.oracle.com/cd/E11035_01/wls100/security/thin_client.html.
"Google Cloud Platform Auth Guide", Published on: Sep. 5, 2015 Available at: https://cloud.google.com/docs/authentication.

* cited by examiner

CONTAINER CREDENTIALING BY HOST

CROSS-REFERENCE TO RELATED APPLICATION

The present application claims the benefit of U.S. Provisional Patent Application Ser. No. 62/292,848 by Novak et al., which is entitled "Container Credentials" and was filed Feb. 8, 2016, the disclosure of which is incorporated herein by this reference as though fully set forth herein.

BACKGROUND

The use of virtualized servers has enabled a rapid growth in sharing processing resources and data for on-demand software services. For example, virtualized servers can be used to process data from users and enterprises in third party data centers. In some examples, the virtualized servers can be executed by a kernel of a host operating system that enables multiple isolated instances of software containers (also referred to herein as containers). The software containers can include any suitable operating system and any number of applications. Accordingly, a host server can implement any suitable number of software containers that include isolated user-space instances of virtualized servers with an operating system and corresponding applications.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An example of a system providing credentials can include a memory device for storing instructions, a processing device for executing instructions, and a container to execute a runtime environment for an application through the memory device and processing device. In an example, the application can request access to a credential locked resource. In an example, a host environment to share the memory and the processing device with the container. The host environment may detect a request for the credential to the credential locked resource from the container. The host environment may provide a credential for a credential locked resource to the container if the container is approved to receive the credential based on a policy.

An example of a method for providing credentials comprising can include requesting, with a container operating in a memory device through the execution of a processing device, a credential to a credential locked resource. In an example, the method can also include detecting, with a host environment sharing the memory device and processing device with the container, the request for the credential to the credential locked resource from the container. In an example, the method can also include providing a credential for a credential locked resource to the container if the container is approved to receive the credential based on a policy.

In an example, one or more computer-readable storage devices for providing credentials may include a number of instructions. In an example, the instruction may, based at least on execution by a processor, cause the processor to detect, with a host environment communicatively coupled to a container, a request for a credential to the credential locked resource from the container. In an example, the instruction may, based at least on execution by a processor, cause the processor to provide a credential for a credential locked resource to the container if the container is approved to receive the credential based on a policy.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
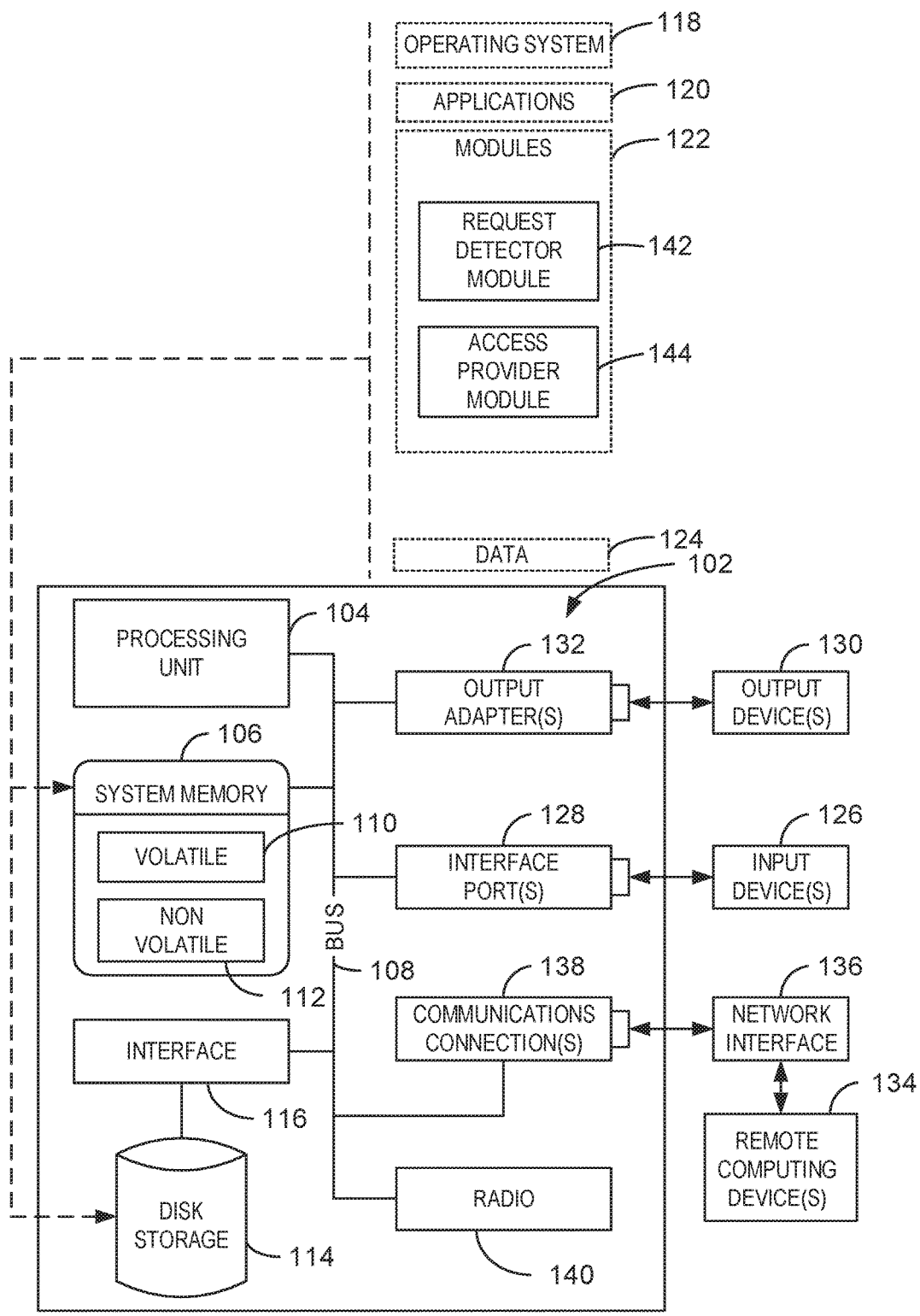
FIG. 1 is a block diagram of an example of a computing system that can implement container credentialing by a host.

Operating systems have previously utilized various resource partitioning techniques to enable a higher density of server deployments. However, container-based approaches to cloud computing offers higher compatibility between applications and virtualized servers, as well as an increased density, enabling more virtualized applications composed of mini-services to simultaneously run on each host server. Therefore, container-based approaches to cloud computing can lower costs of software development and increase revenue for the same facilities and hardware.

In some embodiments, container-based approaches to cloud computing can depend on access to resources requiring a credential. Many operating system services, device drivers, and files for a container are shared or indeed hosted with the host operating system. Resources that can also require a credential include off-box resources, such as file servers and databases. The sharing of resources achieves a higher density of container instances than an equivalent deployment of virtual machines. The subset of services and settings that correspond to a container instance may be restricted unless a credential is provided.

In prior implementations of container credentialing, a hosting environment can be given credentials by the management layer and can store credentials for a container in a container accessible location. From the container accessible location, the container may have accessed, retrieved, and stored full credentials. As used herein, a full credential refers to an unencrypted credential that does not include an expiry. In these previous implementations, the container may not have interacted with the hosting environment when accessing a resource requiring a credential. Additionally, container images can be public and therefore cannot store secrets inside of them. In some examples, the hosting environment may accordingly obtain the container image from one source and corresponding credentials from a second source. In previous implementations, the credentials can still be exposed to the container in the clear at runtime, leading to potential insecurity. The presently disclosed solution supports automatic credential rolling. In addition, the present disclosure shows a scheme to provide strong protection of the credentials, where full credentials can be hidden from the container itself, while still providing oracle access.

In the present disclosure, initial credentialing of containers may be handled by a host. The host may include a facility for requesting and storing credentials on behalf of the container. The container seeking a credential for a specific resource for the first time may request the credential from the hosting environment. The hosting environment may then determine if the container has authorization to access the resource through the requested credential. As used herein, the credential can be returned to the container along with a time hint. A cleartext credential may be a thing in itself, but alternatives—either encrypted credential or cookie—may make another trip to the host to use the credential as the container can't make sense of an unreadable alternative on its own.

As container images can be publicly known through container repositories, currently disclosed systems and methods can avoid providing full credentials to a container to increase security in container deployments.

As is presently disclosed, a container may avoid storing credentials to access a resource at the containers creation. Instead, a container seeking initial credentialing can request access to a resource requiring a credential. The container may not request access to the resource directly, but instead request access to the resource from the hosting environment. The hosting environment can provide access to the resource with a credential or other means discussed above. As used herein, the credential locked resource can be any resource that are inaccessible without a credential or credential substitute. A credential substitute can be a cookie. A credential substitute can also include an action that achieves the end result of establishing an authenticated session with the resource. For example, if the container requests access to a resource in order to send and receive data to and from the resource and if the container requests the host provide this initial access, the host may send an initial credential or act as a proxy to the resource.

As used herein, an initial credential can be provided to a container on demand, and the host OS can be involved in the process of procurement. As disclosed herein, once credential procurement has occurred, the container may use the credential, either directly or by proxy, to authenticate to the target resource. A hosting environment may also refuse an initial credential request by a container to provide a credential, cookie, or specific credential locked resource to a container. A refusal by the hosting environment may be based on the lack of permission for a container or application executing in the container to access the credential locked resource. A refusal by the hosting environment may also be based on the hosting environment's inability to access the credential for some other reason.

The techniques described herein enable a host operating system to implement initial container credentialing by a host. As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can implement container credentialing by a host. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), ReRAM (such as 3D XPoint), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink® DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/nonvolatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, a request detector module 142 and an access provider module 144. In some embodiments, the request detector module 142 can detect, with a host environment communicatively coupled to a container, an initial request for access to a credential locked resource from the container. In an example, the host environment can include a credential cache to store credentials and a credential fetcher to check the credential cache for a credential to access the credential locked resource based on a detected request for access to the credential locked resource. In an example, the credential fetcher may request an initial credential from a credential management service if the credential is not present in the credential cache.

In some embodiments, the access provider module 144 can provide an initial access for a credential locked resource to the container if the container is approved to receive the container specific access to a credential based on a policy. In an example, the policy is to provide a specific container access to a credential based on a security level the container.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the request detector module 142 and the access provider module 144 may be partially, or entirely, implemented in hardware and/or in the processor 104. For example, the functionality may be implemented with an application specific integrated circuit, in logic implemented in the processor 104, or in any other device.

Figure 2:
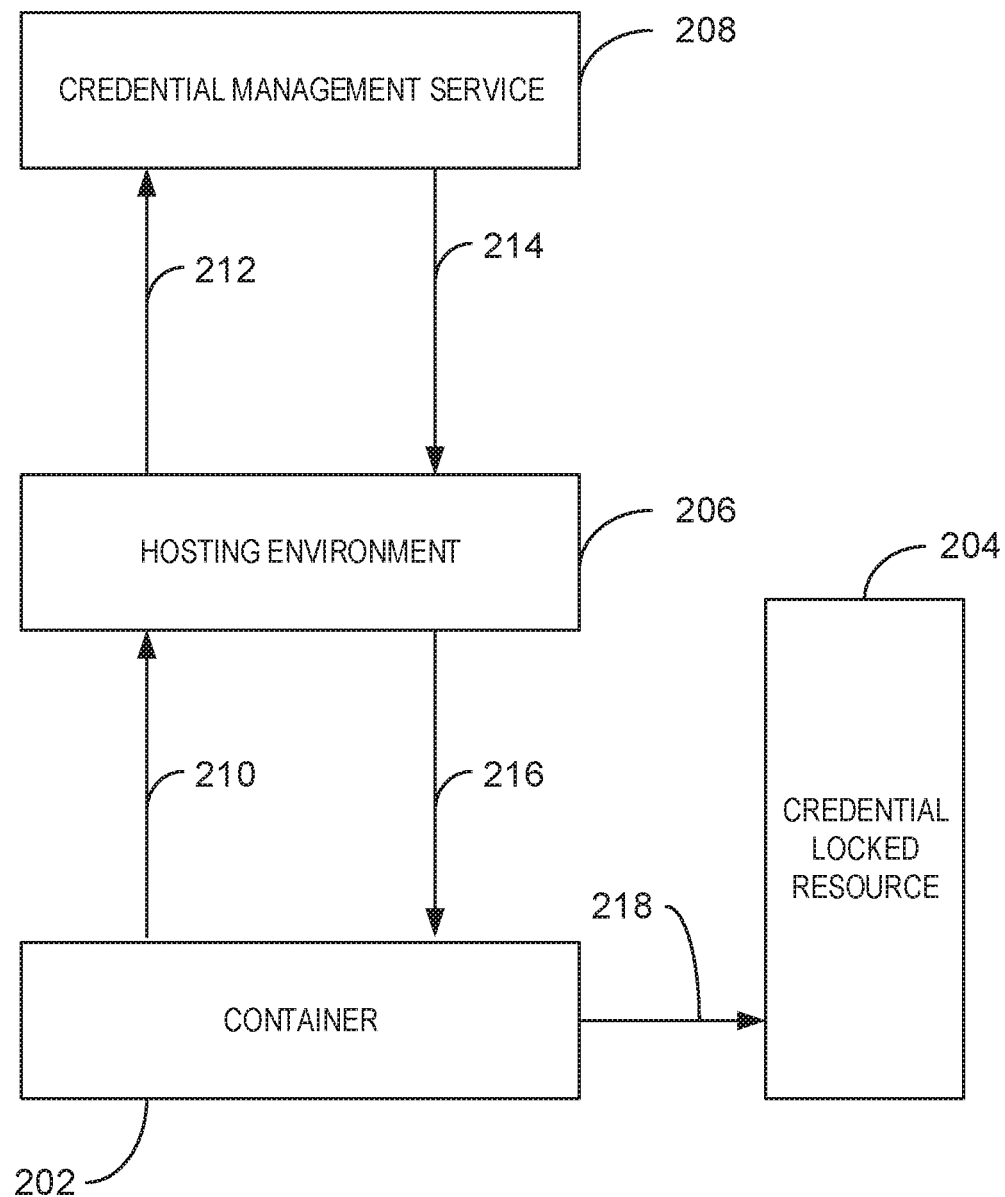
FIG. 2 is a schematic diagram illustrating a hosting system implementing container credentialing.

FIG. 2 is a schematic diagram illustrating a hosting system 200 implementing container credentialing. The hosting system 200 can be implemented with any suitable computing device such as the computing system 102 of FIG. 1

The container 202 can attempt to access a credential locked resource 204. In an example, a container can be stored in a memory device of a computing system and where the instructions from the container may be transmitted to a host environment 206 for execution on a processing resource shared by the container and the host environment 206. As used herein, a container 202 may be a bundle of software that can include one or more applications and system files needed to execute the one or more applications in the container 202. The credential locked resource 204 may be a server, a processor, a data store, a peripheral device, or any other suitable resource a computer application may access. The hosting environment 206 as used herein may be an operating system for a computing system.

In some embodiments, a container image can also include private or new instances of files or directories stored in the host image. For example, a log file directory in the container image and a temporary file directory in the container image can be initialized when generating the container image. Initially, the log file directory and the temporary file directory can be empty and may be populated as applications or processes are executed within the container image. In some examples, the container image can also include information that is not stored in the host image. For example, the container image can include an application that is not stored in the host image. In some embodiments, the application can be loaded from a remote source, an external memory device, and the like. The container image can also include files from the host image that have been modified, new files that have been created, and the like.

Once a container 202 is created, such as through a container image as described above, the container 202 may provide a runtime environment for an application within the container 202. The application may wish to access the credential locked resource 204 and may require an initial credential. In an example, once an initial credential, the container can use the credential, either directly or by proxy, to authenticate to the target resource.

The hosting environment may interface with a credential management service 208. The credential management service may not be locally located to a computing system but can be located remotely on a distant server or stored in a network other than where the hosting environment is stored and executing. An application executing in a container 202 wishing to initially access the credential locked resource may prompt 210 the container 202 to initially request the credential from the hosting environment 206. In response to the prompt 210 from the container, the hosting environment may determine if the container has authorization to access the credential which is may be used to unlock the credential locked resource 204. In response to the prompt 210 from the container, the hosting environment may determine if the application in the container has authorization to access the credential locked resource 204.

If the hosting environment 206 determines that the container has authorization based on a policy, the hosting environment may request 214 a credential from the credential management service 208. The credential may be a credential cookie indicating a location by which a hosting system or a container may access a full credential. As used herein, access can include direct access, e.g. getting a value, and oracle access, e.g. making use of a credential without ever discovering its plaintext value. The credential management service 208 can return 214 the credential to the hosting environment 206. When the hosting environment 206 receives the credential, the hosting environment 206 may pass the initial credential to the container 202. The credential may also be withheld from the container 202 and instead only a credential cookie may be passed to the container 202. In either case, credential or cookie, both types can expire based on an expiry time set by the credential management service 208.

If the container 202 has been initially provided the credential, a credential cookie, or access to the resource through the hosting environment 206, then the container 202 accesses 218 the credential locked resource 204. The container 202 may continue to subsequently use the credential, either directly or by proxy, to authenticate to the resource 204. Access 218 of the resource can include a communication, an instruction, a query, and the like.

Figure 3:
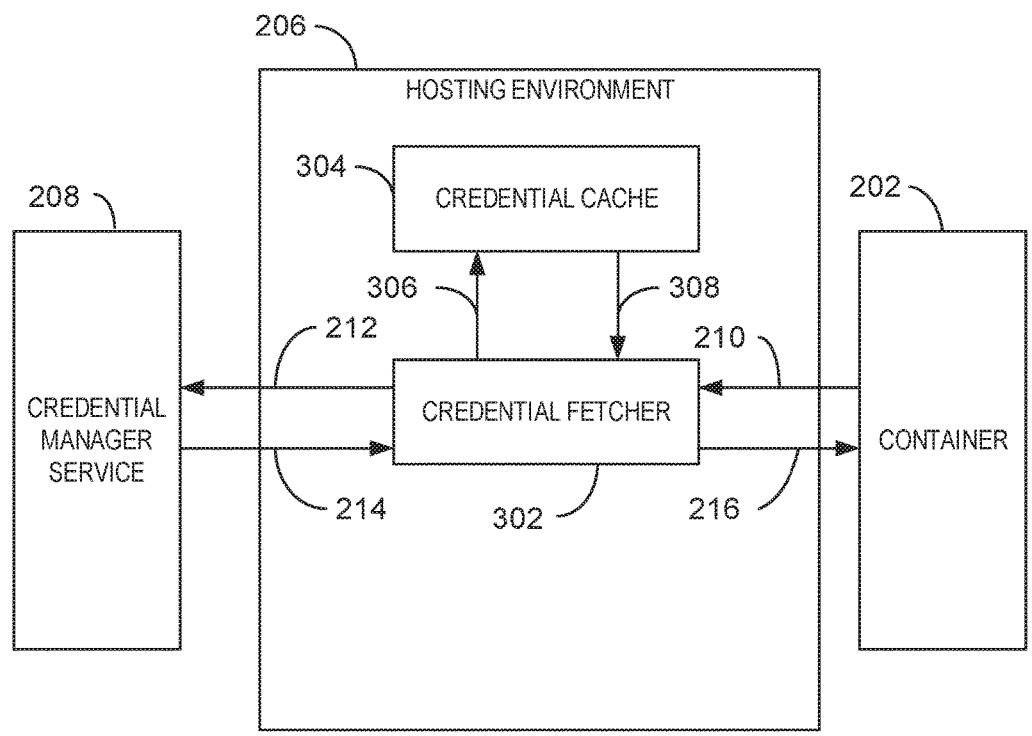
FIG. 3 is a block diagram illustrating a host system with a credential cache and a credential fetcher.

FIG. 3 is a block diagram illustrating a host system 300 with a credential cache and a credential fetcher. The host operating system 300 can be implemented with any suitable computing device such as the computing system 102 of FIG. 1. Like numbered items are as described in FIG. 2 above.

A hosting environment 206 can detect with a credential fetcher 302 an initial request 210 for a credential from a container 202. The credential fetcher 302 may be located within the hosting environment external to the container to avoid including the credential fetcher 302 in a public container image 202. In an example, the hosting environment 206 may include a credential cache 304. The credential cache 304 can store a number of credentials for a container or a number of containers as discussed below. The credential cookies can also be generated by the hosting environment to be sent to the container 202.

The credential cache 304 can also be pre-requested by the hosting environment from the credential manager service 208 based on the container 202 that may be sharing resources with the hosting environment 206. The pre-requesting of credentials as used herein may refer to the requesting of potentially useful credentials for a container prior to the container requesting the credential. The pre-requesting of credentials for storage in credential cache 304 may speed access of credential locked resources 204. The pre-requesting of credential for storage in a credential cache 304 may also provide robust security and access of secured resources even when connection to a credential management service 208 is unavailable.

If the credential fetcher 302 detects a request for a credential from a container 202, the credential fetcher 302 may first check 306 a credential cache 304 to determine if the credential or access may already be available in the credential cache 304. Further, the credential cache 304 may span multiple containers. Accordingly, credential initially requested by one container 202 can be cached in a credential cache 304 and then usable by a second container. This multiple container use can be implemented and governed by a policy in the hosting environment, the policy to determine if access is granted to the credential. If the credential is available in the credential cache 304, the credential cache 304 may provide 308 the credential to the credential fetcher. Upon receiving the credential from the credential cache 304, the credential fetcher 302 may deliver 216 the credential to the container 202. As discussed above, the hosting environment 206 may not always deliver a credential in full to the container 202. The hosting environment 206 may use the credential to provide access in a number of ways including use of an encrypted credential, a credential cookie, or by accessing the credential locked resource 204 itself. In an example, the credential provided may have an expiry.

It is to be understood that the block diagram of FIG. 3 is not intended to indicate that the host operating system 300 is to include all of the components shown in FIG. 3. Rather, the host operating system 300 can include fewer or additional components not illustrated in FIG. 3. Furthermore, the host operating system 300 can include alternative components. For example, the host operating system 300 can include any suitable operating system such as a version of Windows®, Linux®, any Apple® operating system, any Google® operating system, or any Amazon® operating system, among others. By contrast, the container runtime can include a different operating system than the host operating system 300. In some examples, the container runtime can implement a version of Linux®, an Apple® operating system, any Google® operating system, or any Amazon® operating system, while the host operating system implements a version of Windows®.

Figure 4:
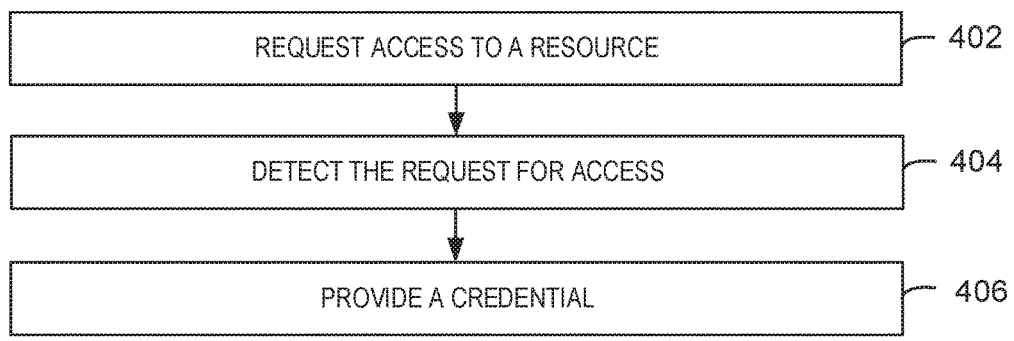
FIG. 4 is a process flow diagram of an example method for implementing container credentialing by a host.

FIG. 4 is a process flow diagram of an example method for implementing container credentialing by a host. The method 400 can be implemented with any suitable computing device, such as the computing system 102 of FIG. 1.

At block 402, the method for providing credentials can include requesting, with a container operating in a memory device through the execution of a processing device, access to a credential locked resource. At block 404, the method for providing a credential can include detecting, with a host environment sharing the memory device and processing device with the container, the request for access to the credential locked resource from the container. At block 406, the method for providing a credential can include providing access to a specific container for a specified credential locked resource to the specific container if the container is approved to receive the access based on a policy. In an example, the policy can include the identity of the container itself. If an OS image inside the container uses a system identity, this identity can be described by the policy. This identity may be fetched just like any other credential. In an example, the policy can include a list of credentials allowed to be fetched by the container as listed in the policy. In an example, the policy can include the type of credential management service to be used. In an example, the policy can include instructions for pre-filling the cache with relevant credentials. This pre-filling can be updated as containers are used or retired to reduce latency on credential requests.

In one embodiment, the process flow diagram of FIG. 4 is intended to indicate that the steps of the method 400 are to be executed in a particular order. Alternatively, in other embodiments, the steps of the method 400 can be executed in any suitable order and any suitable number of the steps of the method 400 can be included. Further, any number of additional steps may be included within the method 400, depending on the specific application. For example, the host environment can include a credential cache to store credentials and a credential fetcher to check the credential cache for a credential to access the credential locked resource based on a detected request for access to the credential locked resource. In an example, the credential fetcher requests a credential from a credential management service if the credential is not present in the credential cache. In an example, the container may not gain access to the credential locked resource without communication to the host environment. In an example, the access to be provided to the container is a credential cookie, an encrypted credential for storage in the container corresponding to a credential identifier supplied from the host environment, or a credential cookie to expire after an expiry time.

A subset of services, applications, and similar resources may correspond to a container instance. These services, applications, and resources may be restricted unless a credential is provided. In an example, an application or even an entire container may be restricted such that these resources may be inaccessible to the container or application within the container unless credential is provided. While a resource or data set may be available to parts of a system, the selective provision of credentials can regulate which containers and which applications in containers may access these resources. In an example, once a credential locked resource may be accessed, an additional step can include transmitting data from the credential locked resource to the container. The transmitting of data can be through a direct connection or pathway or via the hosting environment.

Figure 5:
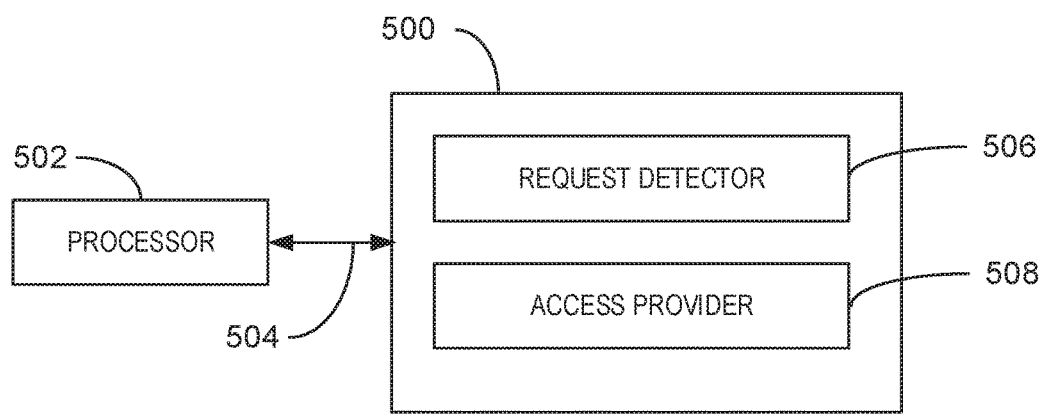
FIG. 5 is a block diagram of an example computer-readable storage media that can implement container credentialing by a host.

FIG. 5 is a block diagram of an example computer-readable storage media that can implement container credentialing by a host. The tangible, computer-readable storage media 500 may be accessed by a processor 502 over a computer bus 504. Furthermore, the tangible, computer-readable storage media 600 may include code to direct the processor 502 to perform the steps of the current method.

The various software components discussed herein may be stored on the tangible, computer-readable storage media 500, as indicated in FIG. 5. For example, the tangible computer-readable storage media 500 can include a request detector 506 and an access provider 508.

In some embodiments, the request detector 506 can detect, with a host environment communicatively coupled to a container, a request for access to the credential locked resource from the container. In an example, the host environment can include a credential cache to store credentials, a credential fetcher to check the credential cache for a credential to access the credential locked resource based on a detected request for access to the credential locked resource. In an example, the credential fetcher may request a credential from a credential management service if the credential is not present in the credential cache.

In some embodiments, the access provider 508 can provide access for a credential locked resource to the container if the container is approved to receive the access based on a policy. In an example, the policy is to provide the access for the container based on a security level the container.

It is to be understood that any number of additional software components not shown in FIG. 5 may be included within the tangible, computer-readable storage media 500, depending on the specific application.

Figure 6:
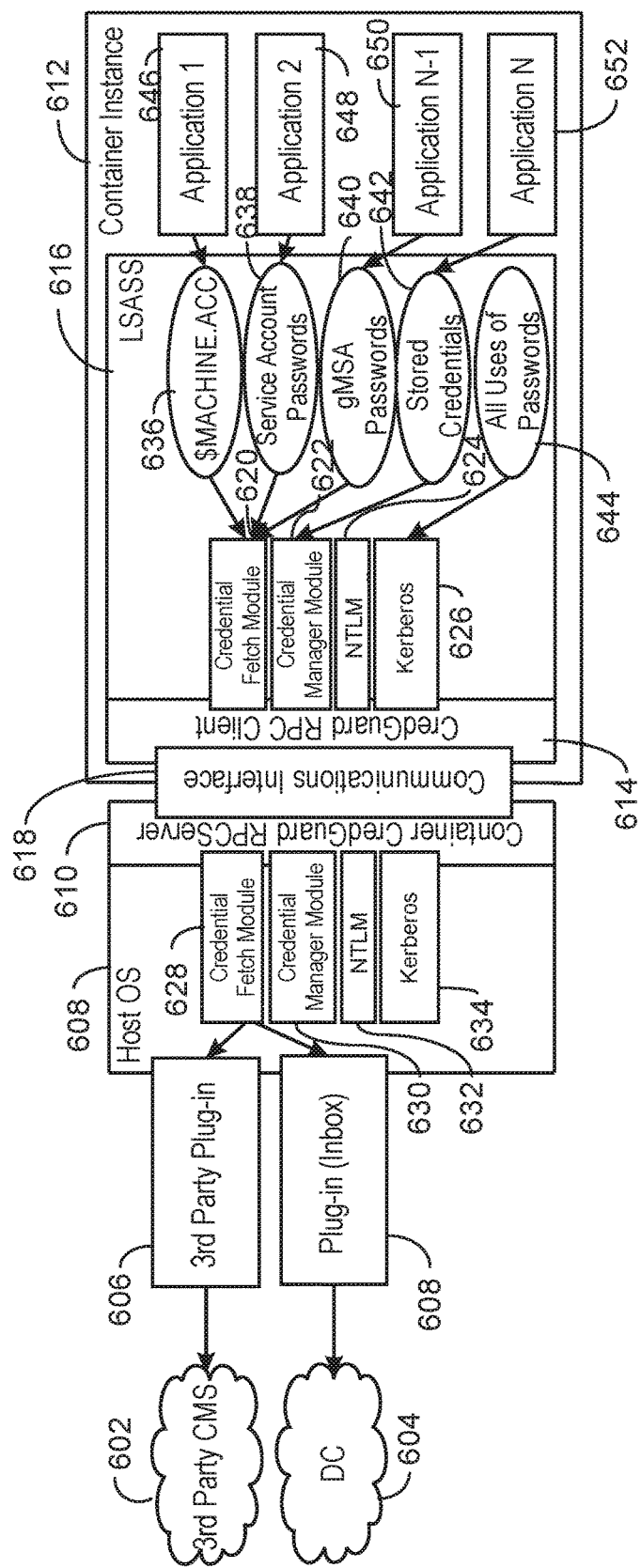
FIG. 6 is a block diagram of an example implementation of a credential guard by a host computing device that includes containers.

FIG. 6 is a block diagram of an example implementation of a credential guard by a host computing device 600 that includes containers. The methods and hardware discussed can also be implemented with any suitable computing device, such as the computing system 102 of FIG. 1. FIG. 6 also shows, in part, a number of types of credentials that may be stored in a cache, how a host may be integrated with a credential management framework, and how a container may communicate with a host OS. In an example, a trusted execution environment (TEE) can interface to an operating system through remote procedure calls (RPCs). The TEE can include use of virtual secure mode (VSM), trustzone enclaves, or any other suitable environment used to isolate secret information. For example, a container and host OS may create RPC endpoints and update a configuration file such as an XML file to map a port in the container to a container's namespace.

As seen in FIG. 6, a credential management system (CMS) may be run by a 3rd party CMS 602 and may be remote from a system and a container. Credentials may also be accessed from a domain controller (DC) 604 such as a Microsoft® Windows® Server Active Directory (AD) DC, Microsoft® Azure AD Domain Services DC (Azure DC), or any other suitable DC. Credentials may be requested and received by a 3rd party plug-in 606 or an plug-in (inbox) 608, respectively. In an example, the plug-in (inbox) 608 can be an AD DC or Azure DC plug-in. In an example, the term (inbox) shows that the AD plugin can be built into a main solution. The design is such that future content management system (CMS) may be plugged in via additional modules which can be contained in separate binaries.

Examples of RPC interfaces can include a communications interface 618 to implement Container Credential Guard (CCG). A container instance 612 may include a CredGuard RPC Client 614 and a Local Security Authority Subsystem Service (LSASS) 616 to request and receive credentials through the communications interface 618. In an example, an endpoint name for containers may be a string form of a globally unique identifier (GUID) or another suitable identifier. In FIG. 6, authentication may include providing a shared secret given to the container instance at launch time. In an example, this pre-shared secret-based authentication can ensure that the container may use its authorized server endpoints.

In an example, a container using a CredGuard RPC client 614 may interface to a host OS 608 for retrieval of each credential type. The host OS 608 may be responsible for satisfying each request from the Container CredGuard RPC Server 610. The host OS 608 may also utilize a pluggable model to integrate with any credential management framework.

Candidates for pluggability may include a host that can be domain joined to a regular AD domain. The host may also utilize its own domain joined status to offer use of these credentials to the container instance 612. In an example, a container's credentials may be available "in the clear" to a host OS 608 but not to a container instance 612 if VSM may be configured on the host. In an example, communication between devices of different types can also include a host talking to a DC 604 to obtain credentials. In an example, robust pluggability may include a host OS 608 integrating with a 3rd party credential management framework.

A credential fetch interface 620, a credential manager module 622, a an NT Local Area Network (LAN) Manager (NTLM) module 624, and a Kerberos module 626 may also be included in a container instance's 612 LSASS 616 implementation. Each of the modules in the container instance 612 may correspond to similar modules in a host OS 608. Specifically, the host OS 608 may also include its own corresponding credential fetch module 628, credential manager module 630, NTLM module 632, and Kerberos module 634. An RPC can include NTLM, Kerberos, Credential Manager, or other suitable RPCs. In an example the container credential guard may expose the RPCs to containers. Another interface can include the credential fetch 620 and the CCG client interface. The CCG client interface can be a client application program interface (API) used to wrap an RPC interface.

In an example, use of the CCG client interface and credential fetch 620 may keep all secure credentials outside of a container instance. Implementing the CCG client and credential fetch 620 allows the handling of unencrypted credentials by the host OS 608. A host OS 608 may also delegate management or requesting of unencrypted credentials to the credential management system 602.

A container may ultimately use several types of credentials to operate. Credential types can include a machine account password used by services running as a "network service" or also used for NTLM pass-through authentication to a domain controller. In an example, a server process, NetLogon, may provide OS instances with domain join functionality, such as, but not limited to, rolling over of a machine account ($Machine.Acc) 636 and group managed service account (gMSA) passwords 640. A credential type may be a local service account password 638. A credential type may be credential manager credentials used by any application that authenticates using stored credentials 642. A credential type may be a SysKey used as a root secret for other similar secrets 644. A credential type may be a certificate private key.

The number of credential and password types can correspond to the number of differing applications, for example, application 1 646, application 2 648, application N–1 650, and application N 652 may each be executed within a container instance 612 and may each make use of a different credential type that may be retrieved and stored in the LSASS 616.

In an example, NetLogon may establish a secure channel with a domain controller for most of its functions. As used herein, containers may not need full NetLogon functionality and NetLogon may be inside containers to perform a minimum subset necessary and change where needed to be container aware. In this mode of operation, the container OS may rely on the host rather than its NetLogon instance for credential management. This mode of operation where the container OS relies on the host rather than its NetLogon instance for credential management may be referred to as an Emulated Domain Join Mode.

As used herein, one job of the Credential Fetch RPC interface exposed by the container Credential Guard server may include receiving a request for a credential from the container. As used herein, one job of the Credential Fetch RPC interface exposed by the container Credential Guard server may include looking the credential up inside the container credential cache, and, on a miss, reaching out to a credential management plug-in registered with a server to satisfy the request from there.

In an example, a credential may be returned to the container in response to the request and may be a cookie corresponding to an entry in the credential cache. As used herein, a cookie to entry can provide a location for the container to access a credential. In an example, the credential may be the actual credential encrypted with a key that may be withheld from the container. No matter the type of credential that may be returned to the container, the credential can be accepted later by the NTLM and Kerberos RPC interfaces as well as OAuth or any other suitable authentication protocol that the CCG server may implement on a container's behalf.

In FIG. 6, a container may include a local credential manager implementation to combine local results with the ones harvested from a CCG host. As discussed above, each application in a container may correspond to a different type of credential that can be accessed by a credential fetch module. As seen in FIG. 6, there can be a separate "credential manager credential" type to be accessed by the credential manager module. In this example, if conflicts arise during combination, the local container results may take precedence over results provided by a host OS. The CCG server's credential manager implementation may fetch the credentials from the credential management server using the same credential fetch implementation as the one used by the credential fetch RPC interface. Results may be cached such that container instances may share credentials and reduce future request times. In an example, writing of credentials, or credwrites, may be localized to the container instance and not outside of the container. In an example, credentials written through credwrite by a clone may not be supported by the RPC interface and thus may not be seen by other clone instances.

As used herein, a CCG server instance may include a normal local procedure call (LPC) or an advanced local procedure call (ALPC) RPC endpoint. In an example, an XML file may be updated to map an ALPC port into the container at the right place in the container's namespace. In this example, a container Local Security Authority Subsystem Service (LSASS) can connect to RPC endpoint.

In an example, an endpoint for the RPC may be a GUID in string form. The RPC can also be a port in TCP. In another example, Dynamic Endpoint may not be supported, since the endpoint may already be a GUID.

Example 1

An example of a system providing credentials can include a memory device for storing instructions, a processing device for executing instructions, and a container to execute a runtime environment for an application through the memory device and processing device. In an example, the application can request access to a credential locked resource. In an example, a host environment to share the memory and the processing device with the container. The host environment may detect a request for the credential to the credential locked resource from the container. The host environment may provide a credential for a credential locked resource to the container if the container is approved to receive the credential based on a policy. Example 1 may also include a host environment that includes a credential cache to store credentials; and a credential fetcher to check the credential cache for the credential to access the credential locked resource based on a detected request for access to the credential locked resource. Example 1 and other examples disclosed may also include a credential fetcher to request a credential from a credential management service if the credential is not present in the credential cache. Example 1 and other examples disclosed may also include a container that does not gain access to the credential locked resource without initial communication to the host environment. Example 1 and other examples disclosed may also include a credential to be provided to the container is a credential cookie to provide a location for the container to access a resource specific credential. Example 1 and other examples disclosed may also include a credential to be provided to the container may be an encrypted credential for storage in the container corresponding to a credential identifier supplied from the host environment. Example 1 and other examples disclosed may also include a credential that may be a credential cookie. Example 1 and other examples disclosed may also include a policy to provide a credential to the container to expire after an expiry time.

Example 2

An example of a method for providing credentials comprising can include requesting, with a container operating in a memory device through the execution of a processing device, a credential to a credential locked resource. In an example, the method can also include detecting, with a host environment sharing the memory device and processing device with the container, the request for the credential to the credential locked resource from the container. In an example, the method can also include providing a credential for a credential locked resource to the container if the container may be approved to receive the credential based on a policy. Example 2 and other examples disclosed may also include a host environment including a credential cache to store credentials and a credential fetcher to check the credential cache for a credential to access the credential locked resource based on a detected request for the credential to the credential locked resource. Example 2 and other examples disclosed may also include a credential fetcher to request a credential from a credential management service if the credential is not present in the credential cache to keep the cache primed with up-to-date credentials. Example 2 and other examples disclosed may also include a container that may not gain access to the credential locked resource without initial communication to the host environment. Example 2 and other examples disclosed may also include a credential to be provided to the container is a credential cookie to provide a location for the container to access a credential. Example 2 and other examples disclosed may also include a credential to be provided to the container may be an encrypted credential for storage in the container corresponding to a credential identifier supplied from the host environment. Example 2 and other examples disclosed may also include a credential to be provided to the container that may be a credential cookie. Example 2 and other examples disclosed may also include a policy that may be to provide the credential for the container to expire after an expiry time.

Example 3

In an example, one or more computer-readable storage devices for providing credentials may include a number of instructions. In an example, the instruction may, based at least on execution by a processor, cause the processor to detect, with a host environment communicatively coupled to a container, a request for a credential to the credential locked resource from the container. In an example, the instruction may, based at least on execution by a processor, cause the processor to provide a credential for a credential locked resource to the container if the container is approved to receive the credential based on a policy. Example 3 and other examples disclosed may also include a host environment including a credential cache to store credentials and a credential fetcher to check the credential cache for the credential to access the credential locked resource based on a detected request for the credential to the credential locked resource. Example 3 and other examples disclosed may also include a credential fetcher requests a credential from a credential management service if the credential is not present in the credential cache. Example 3 and other examples disclosed may also include a policy that may provide the credential to expire after an expiry time.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for providing access to a credential locked resource comprising:
   a memory device for storing instructions;
   a processing device for executing instructions; and
   a host environment to operate on and share the memory device and the processing device with a plurality of containers to enable the plurality of containers to share host credentialing, a first container of the plurality of containers to execute a first runtime for a first application while the second container of the plurality of containers to execute a second runtime distinct from the first runtime for a second application each of the plurality of containers to execute a runtime environment for an application through the memory device and the processing device, the host environment to:
   pre-fill a credential cache with the credential to access the credential locked resource;
   detect a request for a credential to the credential locked resource from the first container of the plurality of containers; and
   provide the credential for a credential locked resource to the first container if the first container is approved to receive the credential based on a policy, the first container accessing the credential locked resource using the credential.

2. The system of claim 1, wherein the host environment comprises:
a credential cache to store credentials; and
a credential fetcher to check the credential cache for the credential to access the credential locked resource based on a detected request for access to the credential locked resource.

3. The system of claim 2, wherein the credential fetcher requests the credential from a credential management service if the credential is not present in the credential cache.

4. The system of claim 1, wherein the first container does not gain access to the credential locked resource without initial communication to the host environment.

5. The system of claim 1, wherein the credential to be provided to the first container is a credential cookie to provide a location for the first container to access a resource specific credential.

6. The system of claim 1, wherein the credential to be provided to the first container is an encrypted credential for storage in the first container corresponding to a credential identifier supplied from the host environment.

7. The system of claim 1, wherein the credential to be provided to the first container is a credential cookie.

8. The system of claim 1, wherein the policy is to provide the credential for the first container to expire after an expiry time.

9. A method for providing access to a credential locked resource comprising:
requesting, with a first container of a plurality of containers operating in a memory device through the execution of a processing device, a credential to a credential locked resource, the first container of the plurality of containers to execute a first runtime for a first application while the second container of the plurality of containers to execute a second runtime distinct from the first runtime for a second application where each of the plurality of containers is to execute a runtime environment for an application through the memory device and the processing device;
pre-filling a credential cache with the credential to access the credential locked resource;
detecting, with the host environment that shares the memory device and processing device with the plurality of containers, the request for the credential to the credential locked resource from the first container; and
providing the credential for the credential locked resource to the first container if the first container is approved to receive the credential based on a policy, the first container accessing the credential locked resource using the credential.

10. The method of claim 9, wherein the host environment comprises:
a credential cache to store credentials; and
a credential fetcher to check the credential cache for the credential to access the credential locked resource based on a detected request for the credential to the credential locked resource.

11. The method of claim 10, wherein the credential fetcher requests the credential from a credential management service if the credential is not present in the credential cache to keep the cache primed with up-to-date credentials.

12. The method of claim 9, wherein the first container does not gain access to the credential locked resource without initial communication to the host environment.

13. The method of claim 9, wherein the credential to be provided to the first container is an encrypted credential for storage in the first container corresponding to a credential identifier supplied from the host environment and in the absence of the encrypted credential, the credential provided the first container being a credential cookie to provide a location for the first container to access the credential.

14. The method of claim 9, wherein the credential to be provided to the first container is a credential cookie.

15. The method of claim 9, wherein the policy is to provide the credential for the first container to expire after an expiry time.

16. One or more computer-readable storage devices for providing access to a credential locked resource comprising a plurality of instructions that, based at least on execution by a processor, cause the processor to:
pre-fill a credential cache with the credential to access the credential locked resource;
detect, with a host environment communicatively coupled to a plurality of containers, a request for a credential to the credential locked resource from a first container of the plurality of containers, the first container of the plurality of containers to execute a first runtime for a first application while the second container of the plurality of containers to execute a second runtime distinct from the first runtime for a second application where each of the plurality of containers is to execute a runtime environment for an application through a memory device and a processing device that is shared between both the host environment and the plurality of containers; and
provide the credential for the credential locked resource to the first container if the first container is approved to receive the credential based on a policy, the first container accessing the credential locked resource using the credential.

17. The computer-readable storage devices of claim 16, wherein the host environment comprises:
a credential cache to store credentials; and
a credential fetcher to check the credential cache for the credential to access the credential locked resource based on a detected request for the credential to the credential locked resource.

18. The computer-readable storage devices of claim 17, wherein the credential fetcher requests the credential from a credential management service if the credential is not present in the credential cache.

19. The computer-readable storage devices of claim 16, wherein the policy is to provide the credential to expire after an expiry time.

20. The system of claim 1, wherein the first runtime is a first operating system and the second runtime is a second operating system distinct from the first operating system, where the first application is compatible with the first operating system and not the second operating system.

* * * * *

UNITED STATES PATENT AND TRADEMARK OFFICE
CERTIFICATE OF CORRECTION

PATENT NO. : 10,509,574 B2
APPLICATION NO. : 15/162863
DATED : December 17, 2019
INVENTOR(S) : Mark Novak et al.

It is certified that error appears in the above-identified patent and that said Letters Patent is hereby corrected as shown below:

In the Claims

Column 16, Line 46-Column 17, Line 3, (approx.) Claim 1 should read:
1. A system for providing access to a credential locked resource comprising:
a memory device for storing instructions;
a processing device for executing instructions; and
a host environment to operate on and share the memory device and the processing device with a plurality of containers to enable the plurality of containers to share host credentialing, a first container of the plurality of containers to execute a first runtime for a first application while a second container of the plurality of containers to execute a second runtime distinct from the first runtime for a second application, each of the plurality of containers to execute a runtime environment for applications through the memory device and the processing device, the host environment to:
pre-fill a credential cache with a credential to access the credential locked resource;
detect a request for the credential to the credential locked resource from the first container of the plurality of containers; and
provide the credential for the credential locked resource to the first container if the first container is approved to receive the credential based on a policy, the first container accessing the credential locked resource using the credential.

Column 17, Lines 4-10, (approx.) Claim 2 should read:
2. The system of claim 1, wherein the host environment comprises:
the credential cache to store credentials; and
a credential fetcher to check the credential cache for the credential to access the credential locked resource based on a detected request for access to the credential locked resource.

Column 17, Lines 30-53, (approx.) Claim 9 should read:
9. A method for providing access to a credential locked resource comprising:
requesting, with a first container of a plurality of containers operating in a memory device through the execution of a processing device, a credential to the credential locked resource, the first container of the plurality of containers to execute a first runtime for a first application while a second container of Signed and Sealed this
Fourteenth Day of April, 2020

Andrei Iancu
*Director of the United States Patent and Trademark Office*

CERTIFICATE OF CORRECTION (continued)
U.S. Pat. No. 10,509,574 B2 the plurality of containers to execute a second runtime distinct from the first runtime for a second application, where each of the plurality of containers is to execute a runtime environment for applications through the memory device and the processing device;
pre-filling a credential cache with the credential to access the credential locked resource;
detecting, with a host environment that shares the memory device and the processing device with the plurality of containers, the request for the credential to the credential locked resource from the first container; and
providing the credential for the credential locked resource to the first container if the first container is approved to receive the credential based on a policy, the first container accessing the credential locked resource using the credential.

Column 17, Lines 54-60, (approx.) Claim 10 should read:
10. The method of claim 9, wherein the host environment comprises:
the credential cache to store credentials; and
a credential fetcher to check the credential cache for the credential to access the credential locked resource based on a detected request for the credential to the credential locked resource.

Column 18, Lines 18-41, (approx.) Claim 16 should read:
16. One or more computer-readable storage devices for providing access to a credential locked resource comprising a plurality of instructions that, based at least on execution by a processor, cause the processor to:
pre-fill a credential cache with a credential to access the credential locked resource;
detect, with a host environment communicatively coupled to a plurality of containers, a request for the credential to the credential locked resource from a first container of the plurality of containers, the first container of the plurality of containers to execute a first runtime for a first application while a second container of the plurality of containers to execute a second runtime distinct from the first runtime for a second application, where each of the plurality of containers is to execute a runtime environment for applications through a memory device and a processing device that is shared between both the host environment and the plurality of containers; and
provide the credential for the credential locked resource to the first container if the first container is approved to receive the credential based on a policy, the first container accessing the credential locked resource using the credential.

Column 18, Lines 42-48, (approx.) Claim 17 should read:
17. The computer-readable storage devices of claim 16, wherein the host environment comprises:
the credential cache to store credentials; and
a credential fetcher to check the credential cache for the credential to access the credential locked resource based on the detected request for the credential to the credential locked resource.